United States Patent [19]

Nakamura et al.

[11] Patent Number: 5,147,734
[45] Date of Patent: Sep. 15, 1992

[54] MAGNETIC RECORDING MEDIA MANUFACTURED BY A PROCESS IN WHICH A NEGATIVE BIAS VOLTAGE IS APPLIED TO THE SUBSTRATE DURING SPUTTERING

[75] Inventors: Kyuzo Nakamura; Yoshifumi Ota; Michio Ishikawa; Noriaki Tani; Masanori Hashimoto, all of Yachimata, Japan

[73] Assignee: Nihon Shinku Gijutsu Kabushiki Kaisha, Chigasaki, Japan

[21] Appl. No.: 323,452

[22] Filed: Mar. 14, 1989

[30] Foreign Application Priority Data

Mar. 15, 1988 [JP] Japan .................................. 63-59537

[51] Int. Cl.$^5$ .......................... G11B 5/00; C23C 14/00
[52] U.S. Cl. .................................... 428/694; 428/668; 427/128; 427/129; 204/192.2; 204/192.15; 204/192.12
[58] Field of Search .................. 428/694, 900, 668; 427/128, 129; 204/192.12, 192.15, 192.2

[56] References Cited

U.S. PATENT DOCUMENTS

| | | | |
|---|---|---|---|
| 4,610,911 | 9/1986 | Opfer et al. | 428/213 |
| 4,632,883 | 12/1986 | Howard et al. | 428/611 |
| 4,794,047 | 12/1988 | Funamoto | 428/408 |
| 4,800,457 | 1/1989 | Kryder | 360/113 |

FOREIGN PATENT DOCUMENTS 243672 11/1987 European Pat. Off. .

OTHER PUBLICATIONS

The 35th Lecture Meeting of Applied Physics Assn. Spring 1988 29a-C-9,10 Nakamura et al.
Patent Abstracts of Japan, vol. 12, No. 235 (P-725), Jul. 6, 1988, (published application 63-26827).
Patent Abstracts of Japan, vol. 11, No. 107 (P-563), Apr. 4, 1987, (published application 61-255533).
Ishikawa et al., Digests of the Eleventh Annual Conference on Magnetics in Japan, Nov. 1-4, 1987, p. 18; and translation into English.

*Primary Examiner*—Paul J. Thibodeau
*Assistant Examiner*—Stevan A. Resan
*Attorney, Agent, or Firm*—Armstrong, Nikaido, Marmelstein, Kubovcik & Murray

[57] ABSTRACT

A magnetic recording member with improved coercive force is obtained by:
(a) forming by sputtering or Cr film on a non-magnetic substrate;
(b) forming by sputtering an epitaxially grown film of a Co alloy containing at least Cr as an additional metal on the Cr film formed in the step (a);

and applying a negative bias voltage to the substrate during at least one of steps (a) and (b).

The coercive force of the magnetic recording member is further increased when high-frequency sputtering is used instead of direct current sputtering.

10 Claims, 3 Drawing Sheets

MAGNETIC RECORDING MEDIA MANUFACTURED BY A PROCESS IN WHICH A NEGATIVE BIAS VOLTAGE IS APPLIED TO THE SUBSTRATE DURING SPUTTERING

BACKGROUND OF THE INVENTION

This invention relates to an improvement in a process for manufacturing a magnetic recording member having a high coercive force, and to a magnetic recording member manufacture by the process.

A magnetic recording member manufactured by first forming a Cr film on a non-magnetic substrate (made of aluminum or the like) by vacuum deposition or sputtering, then forming a Co film on the Cr film and epitaxially growing the Co film is known. Since this magnetic recording member has a high coercive force, the recording member is widely used as a hard disc medium on which high-density recording is possible.

For further enhancing the coercive force to meet the need for higher performance of the magnetic recording member, a method has been used in which a Co alloy containing a metal such as Ni, Cr, W, Ta or Pt is used as the material of the film formed on the Cr film. However, when this Co alloy containing a metal such as Ni, Cr, W, Ta or Pt is used, the coercive force is increased only to a limited extent, so that a further enhanced coercive force is still desired.

SUMMARY OF THE INVENTION

A primary object of the present invention to provide a method for manufacturing a magnetic recording member by which the above-mentioned disadvantage is overcome and the coercive force is highly enhanced. This object is attained by forming a film of Cr-containing Co alloy on the Cr film, and applying a negative bias voltage to the substrate during the formation of the Cr film and/or during the formation of the film of Cr-containing Co alloy.

DESCRIPTION OF THE INVENTION

Figure 1:
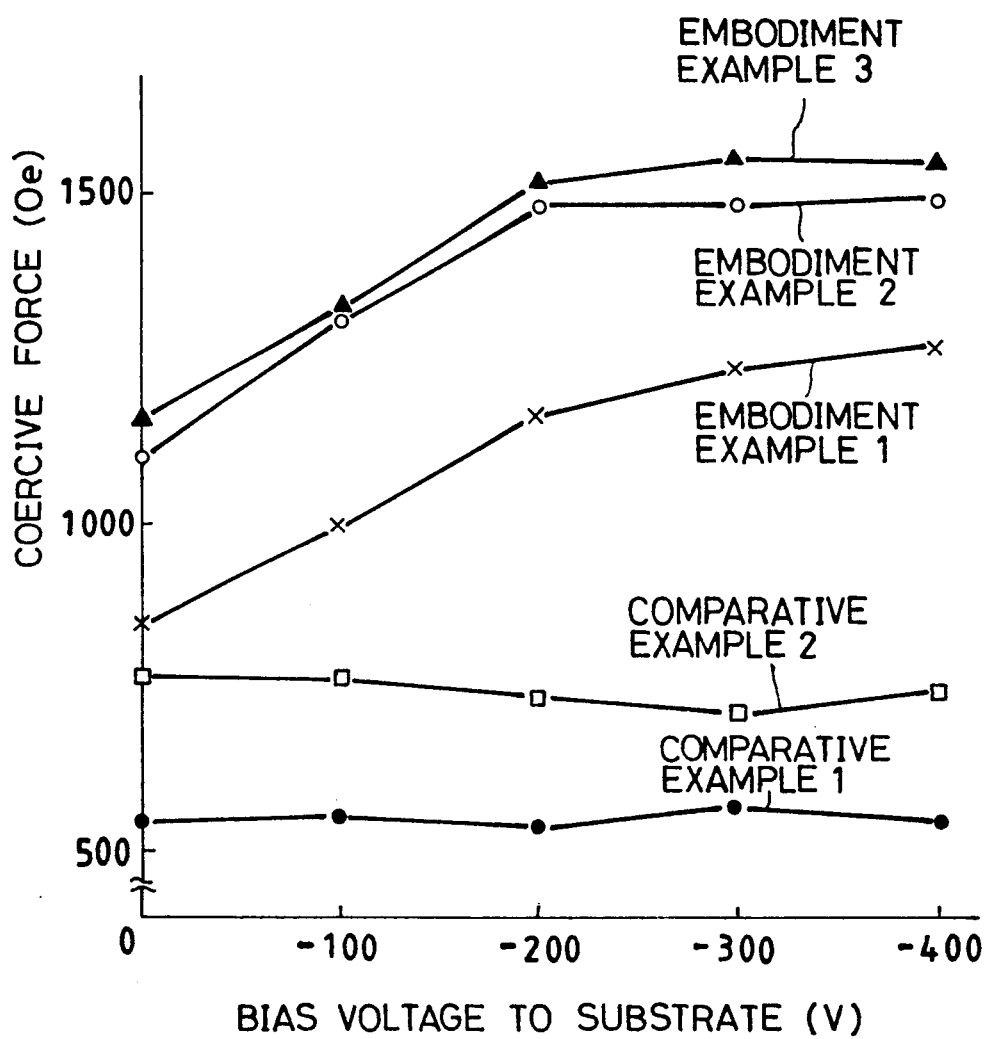
FIG. 1 shows the relationship between the coercive force and the negative bias voltage for Examples 1-3 of the magnetic recording member manufactured by the method of the invention, and for Comparative Examples 1 and 2.

In the process of the invention for manufacturing a magnetic recording member, a Cr film is first formed on a nonmagnetic substrate by sputtering, then a film of a Co alloy containing at least Cr as an additional metal is formed on the Cr film and is epitaxially grown, and a negative bias voltage is applied to the substrate during the formation of the Cr film and/or the formation of the film of Cr-containing Co alloy.

Any Co alloy made of Co and containing at least Cr as an additional metal can be used as the Co alloy in the present invention. For example, a three-component alloy containing a metal such as Ni or Ta in addition to Co and Cr can be used.

A sputtering method using a direct current magnetron cathode may be used for forming the Cr film and the film of Cr-containing Co alloy on the non-magnetic substrate.

It is preferred that the negative bias voltage applied to the substrate during the formation of the Cr film and/or the formation of the film of Cr-containing Co alloy be in the range of from −100 V to −400 V.

The formation of the film of Co alloy on the Cr film may be carried out also by using a high-frequency sputtering method, in which case the coercive force of the magnetic recording member is further increased, as compared to the coercive force of a magnetic recording member obtained in a similar manner, but with direct current sputtering. The negative bias voltage applied in this case is preferably in the range of from −10 V to −200 V.

The following is a possible explanation of why the coercive force is enhanced when a Cr-containing Co alloy is used as the material for the film formed on the Cr film, and a negative bias voltage is applied to the substrate during the formation of the films.

When a Cr film is formed on the substrate by the sputtering method, the (110) plane of the bcc (body-centered cubic) structure of Cr is oriented in parallel to the surface of the substrate, and columnar particles which are isolated from one another by relatively large unfilled spaces are formed. When a Co alloy is sputtered on the surface of the Cr film composed of such columnar particles, the epitaxial growth occurs in such a manner that the C axis of the hcp (hexagonal close packed) structure of the Co alloy is in parallel to the surface of the substrate and, therefore, the film of Co alloy is formed of an aggregate of fine particles isolated from one another. Since this Co alloy has a large crystalline magnetic anisotropy and the direction of the anisotropy is in agreement with the direction of the C axis, the two-layer film (consisting of the layer of Co alloy and the layer of Cr) is comprised of an aggregate of fine particles having a crystalline magnetic anisotrophy in the plane, with the result that a high coercive force is generated. When a Cr-containing Co alloy is used to form the film of Co alloy, Cr is segregated in the grain boundary of crystal grains, thereby forming a non-magnetic layer and enhancing the isolation among the crystal grains, with the result that a further increased coercive force is obtained.

Moreover, when a sputtering method is used in which a negative bias voltage is applied to the substrate during the formation of the Cr film and during the formation of the film of Cr-containing Co alloy, ions of metals such as Co and Cr are accelerated and are implanted into the substrate, thereby activating the diffusion of metal atoms present on the surface and further advancing the segregation of Cr, with the result that a very high coercive force is obtained.

The following is a description of an apparatus which may be used for carrying out the process of the present invention.

A pipe for introducing an inert gas such as argon is connected to a treatment chamber which is connected to an evacuating system such as an exterior vacuum pump so that the vacuum of the treatment chamber can be freely adjusted. A plurality of magnetron sputtering cathodes are arranged in the treatment chamber so that a target can be supported on each cathode. Moreover, a tray moving at a speed of 200 mm/min is provided in the treatment chamber. A substrate is placed on the tray, and while the tray is moved, a Cr film and a film of Cr-containing Co alloy are formed in sequence on the substrate by the sputtering method. A brush is used for the entire tray for applying a bias voltage to the substrate, and the on-off operation of the application of the bias voltage is performed according to the relation between the position of the tray and the position of the cathodes. The sputtering power is adjusted according to the material and the thickness of the films to be formed on the substrate.

The process of the present invention for manufacturing a magnetic recording member by using the above-mentioned apparatus is described in detail with reference to the following Examples, to which the present invention is not limited, and with reference to the following Comparative Examples.

EXAMPLE 1

A Ni/P-plated aluminum hard disk substrate having a diameter of 3.5 inches was placed on the tray in the above-mentioned treatment chamber, and a vacuum of $8 \times 10^{-7}$ Torr or less was produced in the treatment chamber through the evacuation system and argon gas was introduced into the treatment chamber through the gas introducing pipe so that the vacuum of the treatment chamber was $2 \times 10^{-3}$ Torr. While the tray kept heated at 200° C. was moved in the treatment chamber and a negative bias voltage of $-100$ V, $-200$ V, $-300$ V or $-400$ V, respectively, was applied to the substrate through the tray, a Cr film having a thickness of 1500 Å was formed on the substrate by the direct current magnetron sputtering method, and a film of Co-Cr alloy containing 10 atom % of Cr was then formed in a thickness of 400 Å on the Cr film. Then, a C film having a thickness of 400 Å was formed on the film of Co-Cr alloy, without application of a negative bias voltage to the substrate. The coercive force of the obtained magnetic recording member was measured with a vibrating fluxmeter (VSM). The obtained values for the respective applied negative voltages are shown in FIG. 1.

EXAMPLE 2

A magnetic recording member was manufactured in the same manner as described in Example 1 except that a Co-Cr-Ni alloy containing 10 atom % of Cr and 20 atom % of Ni was used for the formation of the film of Cr-containing Co alloy. The coercive force of the obtained magnetic recording member was measured in the same manner as described in Example 1. The measured values are shown in FIG. 1. EXAMPLE 3

A magnetic recording member was manufactured in the same manner as described in Example 1 except that a Co-Cr-Ta alloy containing 12 atom % of Cr and 2 atom % of Ta was used for the formation of the film of Cr-containing Co alloy. The coercive force of the obtained magnetic recording member was measured in the same manner as described in Example 1. The obtained measured values are shown in FIG. 1.

COMPARATIVE EXAMPLE 1

A magnetic recording member was manufactured in the same manner as described in Example 1 except that a film composed solely of Co was formed instead of the film of Cr-containing Co alloy. The coercive force of the obtained magnetic recording member was measured in the same manner as described in Example 1. The obtained measured values are shown in FIG. 1.

COMPARATIVE EXAMPLE 2

A magnetic recording member was manufactured in the same manner as described in Example 1 except that a film of a Co-Ni alloy containing 20 atom % of Ni was formed instead of the film of Cr-containing Co alloy. The coercive force of the obtained magnetic recording member was measured in the same manner as described in Example 1. The obtained measured values are shown in FIG. 1.

As is apparent from FIG. 1, which shows the coercive force of the magnetic recording members obtained in Examples 1, 2 and 3 and Comparative Examples 1 and 2, the coercive force was increased in Examples 1, 2 and 3, which were obtained by a process wherein a film of a Co alloy containing at least Cr as an additional metal was used and a negative bias voltage was applied to the substrate during the formation of the films. In contrast, the coercive force was not increased in Comparative Examples 1 and 2, which were obtained by a process wherein a film composed solely of Cr or a Cr-free Co-Ni alloy was formed, and a bias voltage was even applied to the substrate during the formation of the films.

Accordingly, it was confirmed that in the magnetic recording members obtained in Examples 1, 2 and 3, the coercive force was improved.

EXAMPLE 4

Figure 2:
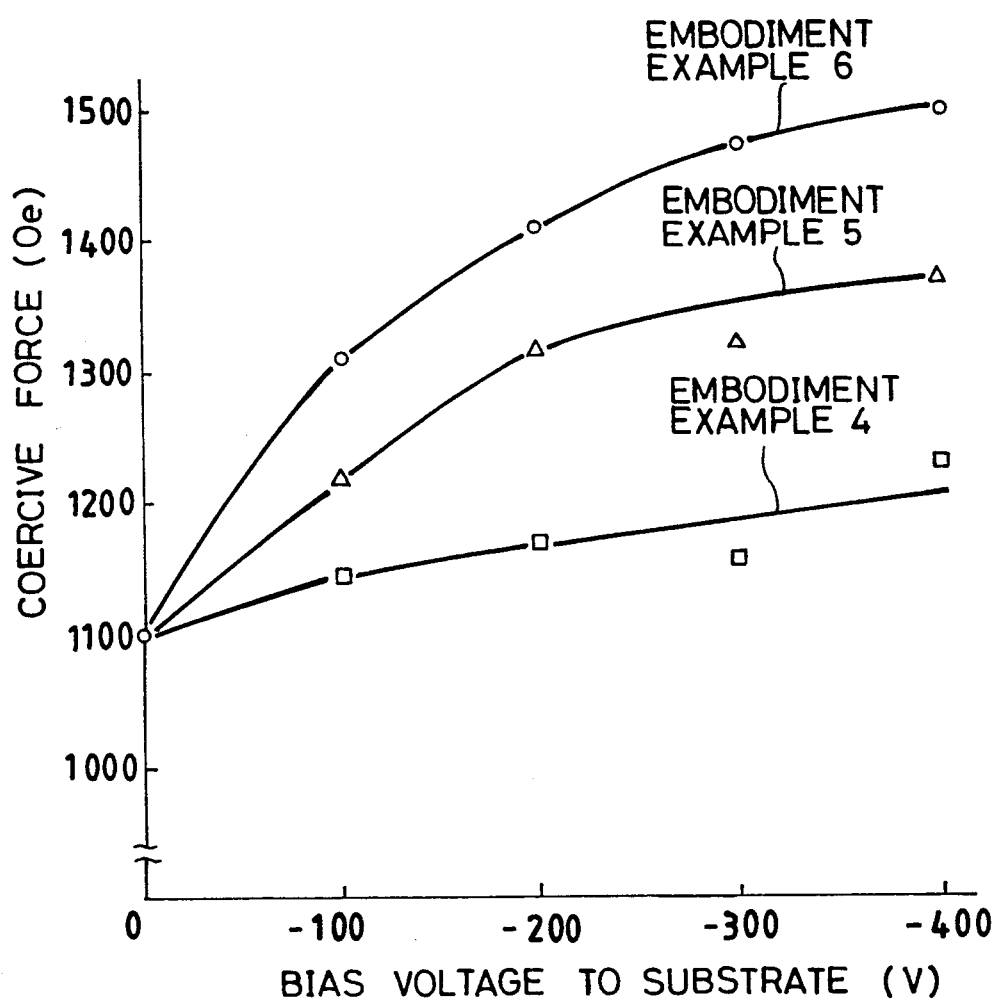
FIG. 2 shows the relationship between the coercive force and the negative bias voltage for Examples 4-6 of the magnetic recording member manufactured by the method of the invention.

A magnetic recording member was manufactured in the same manner as described in Example 1 except that a Co-Cr-Ni alloy containing 10 atom % of Cr and 20 atom % of Ni was used for the formation of the film of Cr-containing Co alloy, and a bias voltage was applied to the substrate through the tray only during the formation of the Cr film. The coercive force of the obtained magnetic recording member was measured in the same manner as described in Example 1. The obtained measured values are shown in FIG. 2.

EXAMPLE 5

A magnetic recording member was manufactured in the same manner as described in Example 1 except that a Co-Cr-Ni alloy containing 10 atom % of Cr and 20 atom % of Ni was used for the formation of the film of Cr-containing Co alloy, and a negative bias voltage was applied to the substrate through the tray only during the formation of the film of Co-Cr-Ni alloy. The coercive force of the obtained magnetic recording member was measured in the same manner as described in Example 1. The obtained measured values are shown in FIG. 2.

EXAMPLE 6

A magnetic recording member was manufactured in the same manner as described in Example 1 except that a Co-Cr-Nl alloy containing 10 atom % of Cr and 20 atom % of Ni was used for the formation of the film of Cr-containing Co alloy, and a negative bias voltage was applied to the substrate through the tray during the formation of the Cr film and during the formation of the film of Co-Cr-Ni alloy. The coercive force of the obtained magnetic recording member was measured in the same manner as described in Example 1. The obtained measured values are shown in FIG. 2.

As is apparent from FIG. 2 which shows the coercive force of the magnetic recording members obtained in Examples 4, 5 and 6, the coercive force was increased in each of the following cases: (a) Example 4 where the negative bias voltage was applied only during the formation of the Cr film, (b) Example 5 where the negative bias voltage was applied only during the formation of the film of Cr-containing Co alloy, and (c) Example 6 where the negative bias voltage was applied during the formation of both the Cr film and the film of Cr-containing Co alloy. The increase of the coercive force was particularly notable when the negative bias voltage was applied during the formation of both the Cr film and film of Cr-containing Co alloy.

Accordingly, it was confirmed that the coercive force was increased in the magnetic recording members obtained in Examples 4, 5 and 6.

EXAMPLE 7

A magnetic recording member was manufactured in the same manner as described in Example 1 except that a Co-Cr-Ni alloy containing 10 atom % of Cr and 20 atom % of Ni was used for the formation of the film of Cr-containing Co alloy. The coercive force of the obtained magnetic recording member was measured in the same manner as described in Example 1. The obtained measured values are shown in FIG. 3.

EXAMPLE 8

A magnetic recording member was manufactured in the same manner as described in Example 1 except that a Co-Cr Ni alloy containing 10 atom % of Cr and 20 atom % of Ni was used for the formation of the film of Cr-containing Co alloy, and this film of Co-Cr-Ni alloy was formed by the sputtering method using high-frequency magnetron cathodes. The coercive force of the obtained magnetic recording member was measured in the same manner as described in Example 1. The obtained measured values are shown in FIG. 3. The ion current supplied to the tray at the time of sputtering on the high-frequency magnetron cathodes was about 5 times the ion current supplied to the tray at the time of sputtering on the direct current magnetron cathodes.

Figure 3:
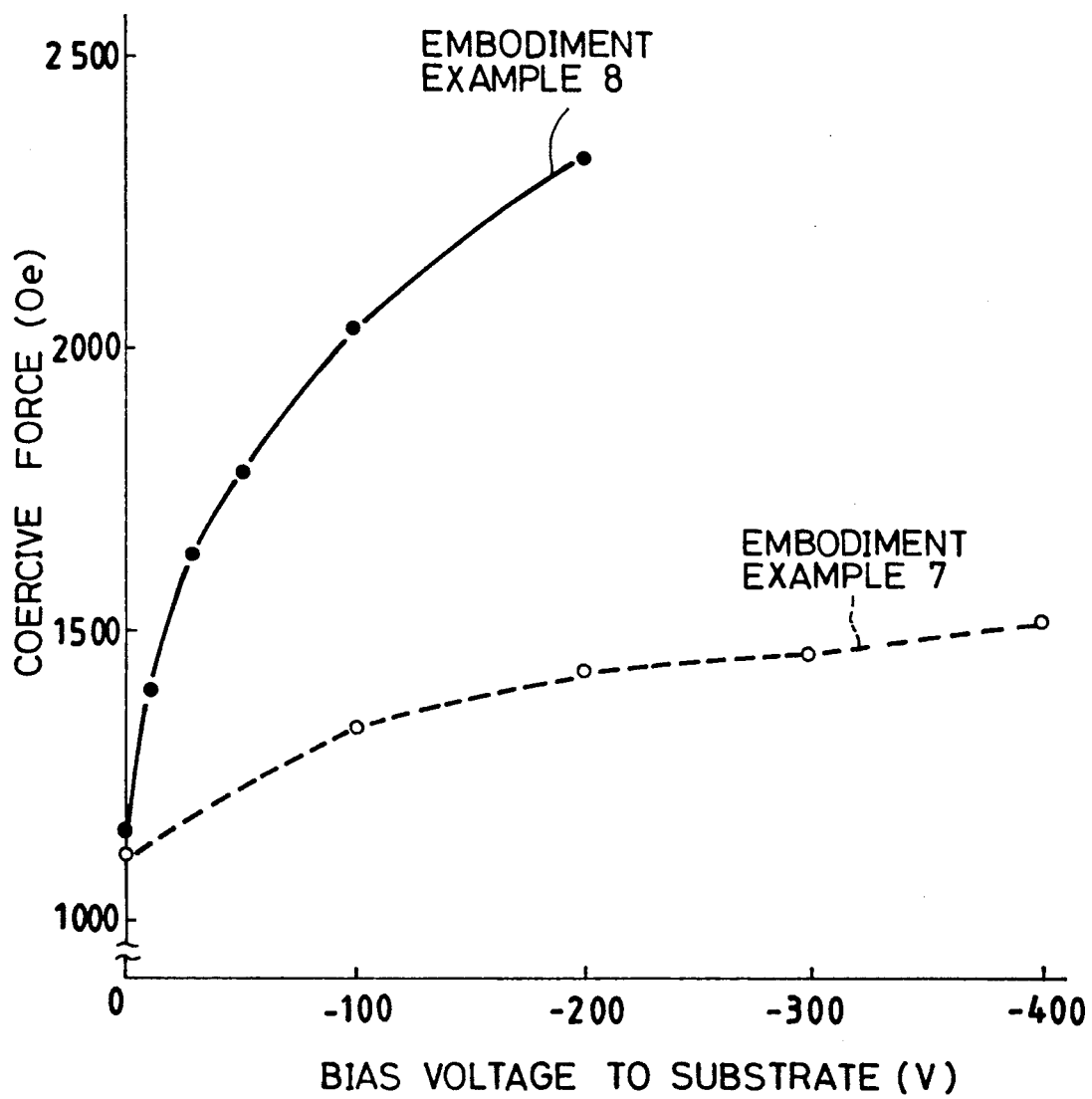
FIG. 3 shows the relationship between the coercive force and the negative bias voltage for Examples 7 and 8 of the magnetic recording member manufactured by the method of the invention.

As is apparent from FIG. 3 which shows the coercive force of the magnetic recording members obtained in Examples 7 and 8, the coercive force was prominently improved in Example 8 where the formation of the film of Cr-containing Co alloy on the Cr film was carried out using the high-frequency sputtering method.

Although a film containing only Cr was used as a base film in the above examples of this invention, the base film can be made also of Cr containing at least one additional element selected from the group consisting of rare earth elements, Si, Cu and P. Magnetic recording members manufactured in the same manner as in the foregoing examples, but containing a base film made of Cr containing at least one of the above additional elements also exhibited improved coercive force.

As shown the foregoing description, the method of this invention provides a means for increasing the coercive force of a magnetic recording member of the type which comprises a film of Co alloy formed by sputtering on a Cr film, which is formed also by sputtering on a non-magnetic substrate. The increase in coercive force is obtained by using as the Co alloy an alloy which contains at least Cr as a metal in addition to Co, and by applying a negative bias voltage to the substrate during the formation of the Cr film and/or during the formation of the film of Cr-containing Co alloy.

A further increase in the coercive force in the magnetic recording member produced by the method of this invention may be obtained by using a high-frequency sputtering method, instead of a direct current sputtering method.

We claim:

1. A process for manufacturing a magnetic recording member, comprising the steps of:
    (a) forming a sputtering a Cr film on a non-magnetic substrate;
    (b) forming by sputtering an epitaxially grown film of a Co alloy containing at least Cr as an additional metal directly on the Cr film formed in the step (a);
    wherein a negative bias voltage is applied to the substrate during the entire duration of step (b), and a negative bias voltage is optionally applied to the substrate during the entire duration of step (a).

2. A process as in claim 1, wherein said sputtering is direct current sputtering.

3. A process as in claim 1, wherein said sputtering is high-frequency sputtering.

4. A process as in claim 2, wherein said negative bias voltage applied in step (a) and optionally in step (b) as in the range of from −100 V to −400 V.

5. A process as in claim 3, wherein said negative bias voltage applied in step (a) and optionally in step (b) is in the range of from −10 V to −200 V.

6. A process as in claim 1, wherein said Co alloy is selected from the group consisting of Co-Cr, Co-Cr-Ni, and Co-Cr-Ta.

7. A magnetic recording member manufactured by a process which comprises the steps of:
    (a) forming by sputtering a Cr film on a non-magnetic substrate;
    (b) forming by sputtering an epitaxially grown film of a Co alloy containing at least Cr as an additional metal directly on the Cr film formed in the step (a);
    wherein a negative bias voltage is applied to the substrate during the entire duration of step (b), and a negative bias voltage is optionally applied to the substrate during the entire duration of step (a).

8. A magnetic recording member as in claim 7, wherein said sputtering is direct current sputtering.

9. A magnetic recording member as in claim 7, wherein said sputtering is high-frequency sputtering.

10. A magnetic recording member as in claim 7, wherein said Co alloy is selected from the group consisting of Co-Cr, Co-Cr-Ni, and Co-Cr-Ta.

* * * * *

UNITED STATES PATENT AND TRADEMARK OFFICE
CERTIFICATE OF CORRECTION

PATENT NO.: 5,147,734
DATED : September 15, 1992
INVENTOR(S): Kyuzo NAKAMURA et al It is certified that an error appears in the above-identified patent and that said Letters Patent is hereby corrected as shown below:

Column 6, line 32, delete "as" and substitute therefor --is--.

Signed and Sealed this

Sixth Day of August, 1996

Attest:

BRUCE LEHMAN

*Attesting Officer*     *Commissioner of Patents and Trademarks*